United States Patent [19]

Cox et al.

[11] 4,388,645
[45] Jun. 14, 1983

[54] TELETEXT COMMUNICATION SYSTEM WITH TIMED MULTIPAGE LOCAL MEMORY

[75] Inventors: Charles M. Cox, Buffalo Grove; William L. Thomas, Northbrook, both of Ill.

[73] Assignee: Zenith Radio Corporation, Glenview, Ill.

[21] Appl. No.: 253,330

[22] Filed: Apr. 13, 1981

[51] Int. Cl.³ .................................. H04N 7/08
[52] U.S. Cl. ............................ 358/147; 358/142; 358/146
[58] Field of Search ............ 358/147, 141, 142, 146, 358/12, 86

[56] References Cited

U.S. PATENT DOCUMENTS

| 3,961,137 | 6/1976 | Hutt | 358/147 |
| 4,175,267 | 11/1979 | Tachi | 358/147 |

FOREIGN PATENT DOCUMENTS

| 20244 | 12/1980 | European Pat. Off. | 358/147 |

OTHER PUBLICATIONS

Wireless World Teletext Decoder 3-Line and Clock Dividers, J. Daniels, Wireless World, Jan. 1976, pp. 37-42.
Ceefax: A Proposed New Broadcasting Service, by Edwardson and Gee, Jan. 1974, Journal of the SMPTE, vol. 83, pp. 14-19.
Oracle—Broadcasting The Written Word, by A. James, Wireless World, Jul. 1973, pp. 314-316.
Teletext Remote Control-2, Interfacing The Remote Control Receiver With The Original Decoder, by R. T. Russell, Wireless World, May 1979, pp. 83-85.

*Primary Examiner*—Tommy P. Chin
*Attorney, Agent, or Firm*—Jack Kail

[57] ABSTRACT

A teletext communications system comprises a transmitter, e.g. an orbiting satellite, transmitting multiple pages of a teletext encoded data service at selected times of the day, each teletext page including a first non-displayable auxiliary teletext data row defining a selected time interval and a unique page memory address code. The transmitter also continuously transmits a second non-displayable auxiliary teletext data row including a time of day code. A teletext decoder is adapted for acquiring and storing each transmitted teletext page at a page memory defined by said page memory address code and automatically rebroadcasts each of the stored pages for which the stored selected time interval coincides with the transmitted time of day code.

20 Claims, 7 Drawing Figures

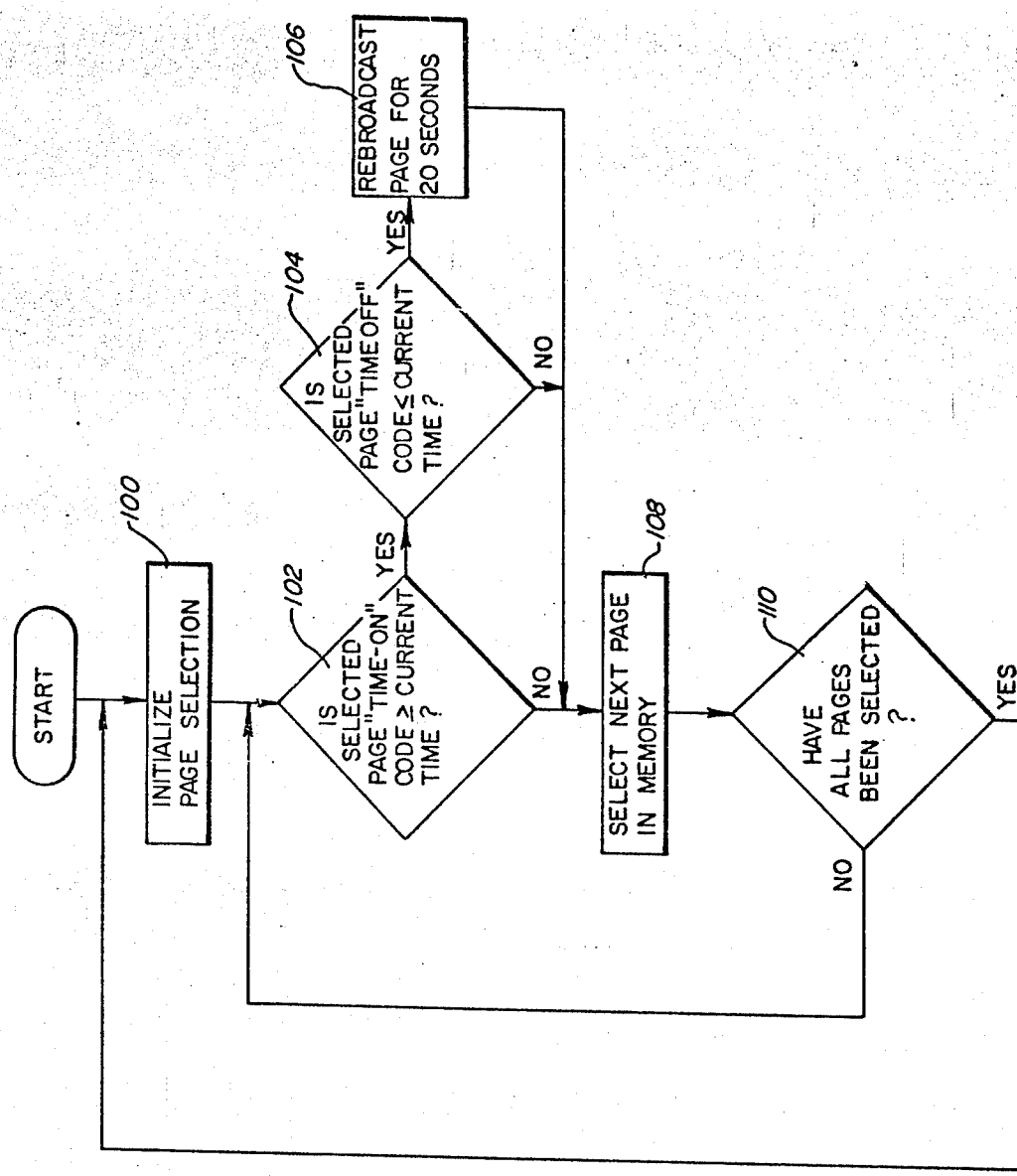

TELETEXT COMMUNICATION SYSTEM WITH TIMED MULTIPAGE LOCAL MEMORY

BACKGROUND OF THE INVENTION

The present invention relates generally to teletext communication systems and, more particularly, to improvements in such systems enabling the storage of multiple pages of received teletext formated data by a central station and the automatic rebroadcasting of the stored data by the central station to a plurality of remote receivers at selected times during the day.

Teletext is a generic term for a new and rapidly growing television based communication technique which uses the vertical blanking interval of a broadcast television signal for transmission of text and graphics information. Systems implementing this technique are presently operational in various countries, such as in England where teletext formated text and graphics material is transmitted in digitally encoded form on lines 17, 18, 330 and 331 of their 625 line system. Television receivers equipped with teletext decoders process the transmitted data for forming a display of the text and graphics information. In the British system, which is exemplary of most teletext systems presently in use, the broadcast teletext information is formated in a plurality of cyclically transmitted rows of data, twenty four rows comprising a page of information with each group of one hundred pages representing a magazine. Each row of information, which is digitally encoded for representing up to 40 characters of text or graphics, is serially transmitted on one horizontal line of the vertical blanking interval so that the data transmission rate is two rows per field or four pages per second. In order to provide reasonable access time to the transmitted teletext information, it is customary to limit the cyclically transmitted data to 800 pages. Each teletext decoder conventionally includes a data acquisition circuit responsive to user commands for acquiring a selected page of the recycling teletext information and for storing the twenty four rows of digitally encoded data comprising the page. The stored encoded data is then applied to a display generator which decodes the stored information for synthesizing R, G, B video characters signals which are coupled to and drive the cathode ray tube of the television receiver for producing a display reflecting the stored data, the display comprising a page of twenty four rows of text or graphics with each row consisting of up to 40 characters. The first row, i.e. row 0, of each page is referred to as a page-header and includes an encoded magazine and page number as well as a row address. The remaining rows include magazine and row address but not page number codes. Acquisition of a selected page of data is therefore achieved in the teletext decoder by initially matching the magazine and page number codes of a transmitted page-header row with user selected magazine and page number codes and then stored the matching page-header row together with the next twenty three rows containing the corresponding magazine number.

In the United States, teletext communication techniques are often used for providing selected information to the subscribers of a cable television system. For example, a cable head end operator may receive a number of standard NTSC television signals transmitted by an orbiting satellite for rebroadcasting to the cable system subscribers with teletext encoded data being transmitted during the vertical interval of any one of these signals. The teletext encoded data transmitted by the satellite may represent any desired information including, for example, multiple pages of a programming guide or the like identifying the content of the television programming signals being transmitted by the satellite. The cable head end facility typically includes a conventional teletext decoder which is slightly modified for acquiring and storing the teletext encoded data transmitted by the satellite in a local multiple page memory. Each page of the stored programming guide may then be rebroadcast by the head end facility at selected times of the day as a standard NTSC television signal for display by the television receivers of the cable system subscribers.

It is an object of the present invention to provide a teletext communications system enabling a cable head end operator to continuously acquire and store multiple pages of information transmitted from a remote source, which information may be updated or changed from time to time.

It is another object of the invention to provide a teletext communications system of the foregoing type wherein the multiple pages of information stored at the cable head end facility are automatically rebroadcast thereby at selected predetermined times during the day without any action or intervention being required on the part of the head end operator.

It is yet a further object of the invention to provide a teletext communications system of the foregoing type wherein the cable head end operator is not responsible for maintaining an accurate time base for keying rebroadcasts of the stored information to the cable system subscribers.

It is still another object of the invention to provide a teletext communications system of the foregoing type wherein the multiple pages of information stored at the cable head end facility are automatically rebroadcast to the subscribers in a cyclical manner.

BRIEF DESCRIPTION OF THE DRAWINGS

The features of this invention which are believed to be novel are set forth with particularity in the appended claims. The invention, together with its objects and the advantages thereof, may best be understood by reference to the following description taken in conjunction with the accompanying drawings, in which like reference numerals identify like elements in the several figures and in which:

FIGS. 2 and 3 are charts illustrating the teletext data formating scheme used in association with the present invention;

FIG. 7 is a flow chart illustrating a microprocessor embodiment of the sequential comparator shown generally in FIG. 4.

DESCRIPTION OF THE PREFERRED EMBODIMENT

For purposes of an exemplary showing, the present invention will hereinafter be described in terms of a teletext communications system generally employing the British teletext transmission standards as set forth in the British Broadcast Teletext Specification, September 1976. It will be appreciated, however, that these standards are in no way intended to limit the scope of the invention which, in general, may be practiced with any teletext-like communications system wherein digitally encoded data is transmitted on one or more unused lines of the vertical blanking interval of a broadcast television signal. Thus, numerous changes to the British teletext format; for example, the number of data rows comprising a page, the number of characters occupying a row, the encoding technique employed, etc. may be made without affecting the scope or utility of the invention.

Figure 1:
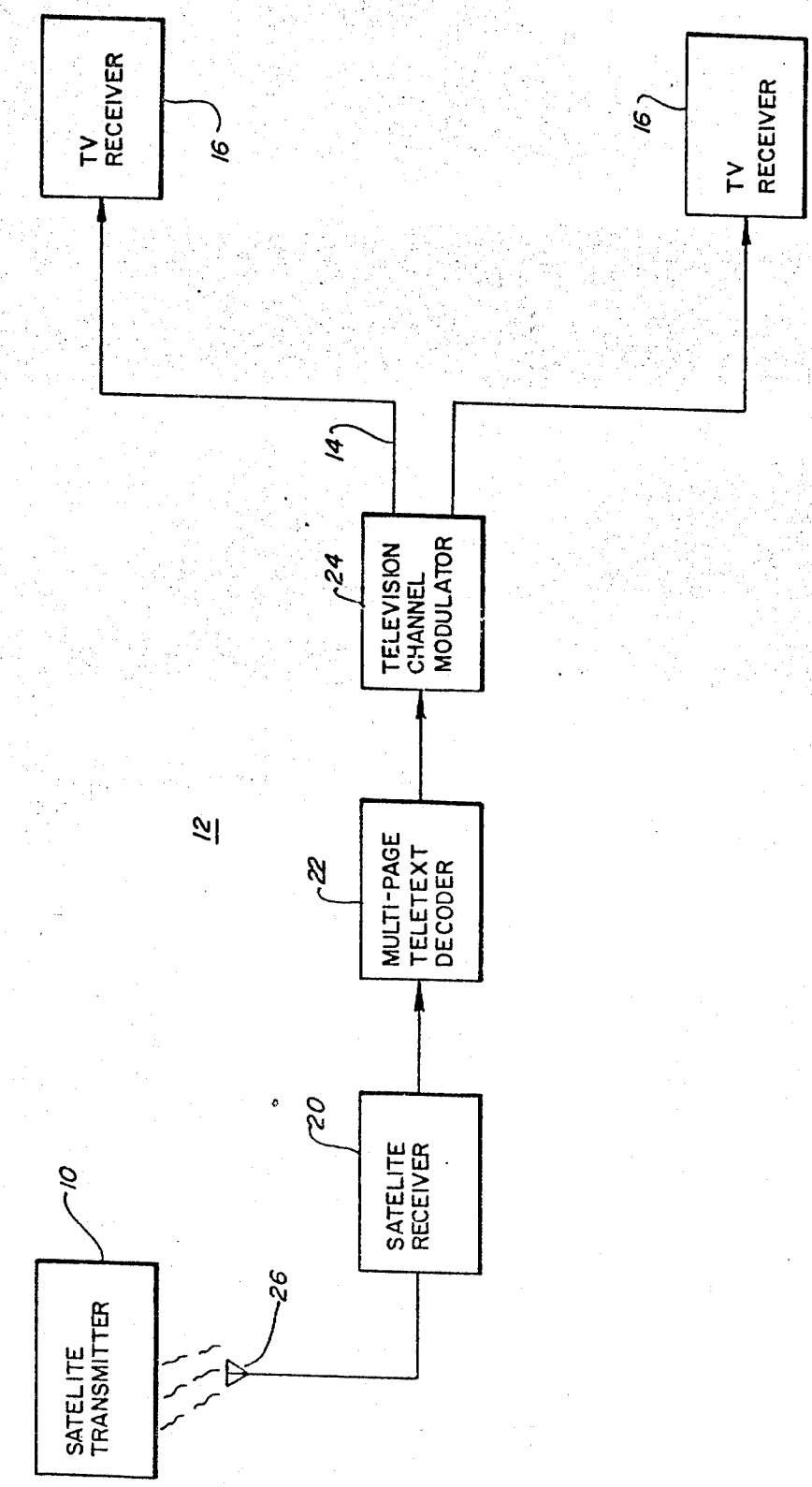
FIG. 1 is a general block diagram showing a teletext communications system according to the present invention.

Referring now to the drawings and, in particular, to FIG. 1, there is shown the system of the invention in general block diagram form. An orbiting satellite 10 is operative for transmitting multiple channels of television signals which are received by a cable head end facility 12 and then rebroadcast over a cable 14 to a plurality of subscriber television receivers 16. According to the invention, e.g. a programming guide, which information may be updated from time to time, together with certain control data is transmitted in teletext encoded format by satellite 10 during the vertical intervals of at least one of the television channels transmitted thereby, the teletext encoded transmissions typically occurring once per day. The control data comprises first and second auxiliary data rows which are transmitted together with each page of the programming guide, each of the auxiliary rows having a row address identifying a data row row which is normally not intended for teletext display. For example, in the British teletext system, rows 24-31, which are commonly referred to as "ghost rows" are not intended for display so that the first auxiliary row may comprise row 24 and the second auxilliary row may comprise row 25. The cable head end facility 12 includes a suitable dish antenna 26 for intercepting and coupling the satellite transmissions to a satellite receiver 20, the satellite receiver 20, in turn, coupling a baseband video signal to the input of a multi-page teletext decoder 22, the baseband video signal including the teletext encoded multiple page programming guide and the control data contained in the auxiliary data rows. Teletext decoder 22 is adated for acquiring these teletext encoded signals and is responsive to the control data for storing each programming guide page in a respective page memory. In addition, decoder 22 is responsive to the control data for automatically reading and decoding the stored programming guide pages during selected times of the day and coupling the decoded pages in a predetermined cyclical manner to the input of a television channel modulator 24. Modulator 24 converts the decoded pages to a standard RF NTSC television signal for rebroadcast over cable 14 to the subscriber receivers 16. The rebroadcast programming guide pages are thereby received by television receivers 16 and displayed for viewing by the system subscribers.

Figures 2, 3:
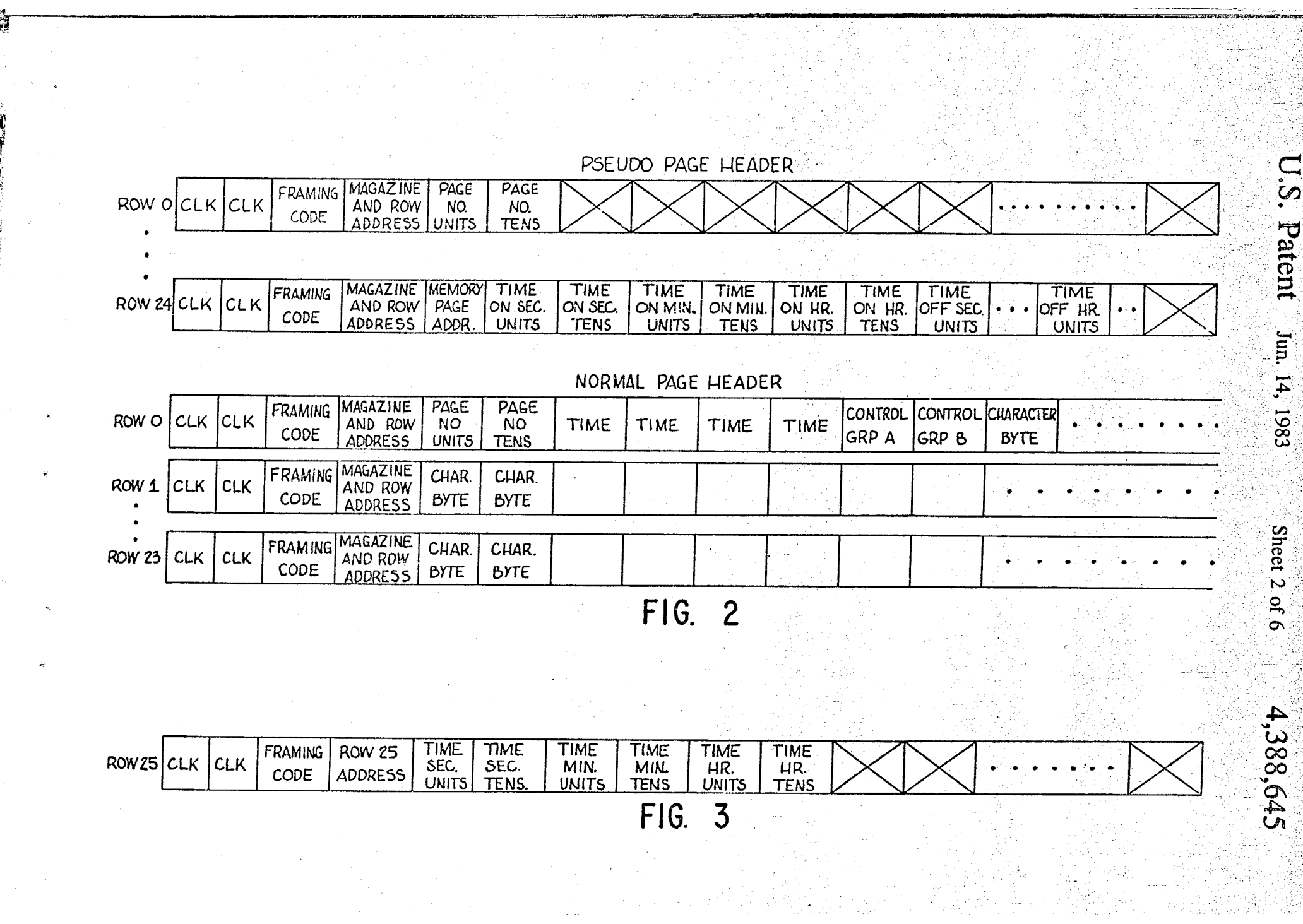

FIG. 2 illustrates the format in which each of the teletext encoded programming guide pages is transmitted by satellite 10. Each page comprises an initial pseudo page header row which enables decoder 22 for acquiring the immediately succeeding first auxiliary row, i.e. row 24. The pseudo page header row includes forty 8-bit data bytes arranged in conventional teletext format with two bytes being used to specify the row address and magazine code and two bytes specifying the page number code. In this regard, it will be recalled that a conventional teletext page consists of 24 rows (rows 0-23) necessitating the use of at least 5-bits to uniquely identify each row address. These 5 bits, however, have the capability of defining up to 32 different row addresses, the row addresses beyond the conventional teletext rows 0-23 defining "ghost rows" which are not intended for display. In accordance with one aspect of the present invention, the two previously mentioned auxiliary rows are selected from among the "ghost rows" and may comprise, for example, rows 24 and 25.

With further reference to FIG. 2, the first auxiliary row, row 24, is transmitted after the pseudo page header row. Row 24, which also comprises forty 8-bit bytes, includes a magazine code identical to the magazine code of the pseudo page header row so as to enable acquisition thereof by decoder 22. Row 24 further includes a memory page address byte, six bytes specifying a time-on code and six bytes specifying a time-off code. The memory page address byte identifies the memory page of the multi-page memory of decoder 22 at which the subsequent teletext page is to be stored while the time-on and time-off codes identify a selected time interval during which it is desired to rebroadcast the stored page from the cable head end facility 12 to the subscriber receivers 16. Following row 24, a conventional teletext page, which may comprise one page of a multiple page programming guide, including a normal page header row and 23 data rows is transmitted by satellite 10, the normal page header row conditioning decoder 22 for acquiring the subsequent data rows 1-23. As will be explained in further detail hereinafter, the transmitted teletext page is stored at a memory page in decoder 22 corresponding to the memory page address of row 24. Each additional programming guide page is formated and transmitted in a similar manner except that a different memory page address and different time-on and time-off codes are specified in row 24. The programming guide pages are transmitted in this manner, for example, once during the day for storage in decoder 22.

FIG. 3 illustrates the manner in which the second auxiliary row, i.e. row 25, is formated, this row being transmitted by satellite 10 on a continuous basis. Row 25 includes a row address byte and six bytes encoded for specifying the time of day. Quite notably, row 25 includes neither magazine nor page number codes enabling acquisition thereof by any decoder 22. In contrast, the rows illustrated in FIG. 2 are acquireable only by decoders which have been set to the particular magazine and page number codes specified in the page header rows facilitating the broadcast of different information to each of a plurality of head end facilities. The time of day code included in row 25 is compared by decoder 22 with the time-on and time-off codes stored in row 24 of each page memory to determine when the associated programming guide page is to be rebroadcast by the head end facility. Thus, by suitably specifying the time-on and time-off codes associated with row 24 of each stored programming guide page, any sequence of pages may be automatically rebroadcast from the head end facility at selected times during the day without requiring any action or intervention on the part of the head end operator. In addition, and as will be explained in further detail hereinafter, the sequence of pages may be cyclically rebroadcast such that, for example, each page is displayed in turn for a time interval of about 20 seconds.

Figure 4:
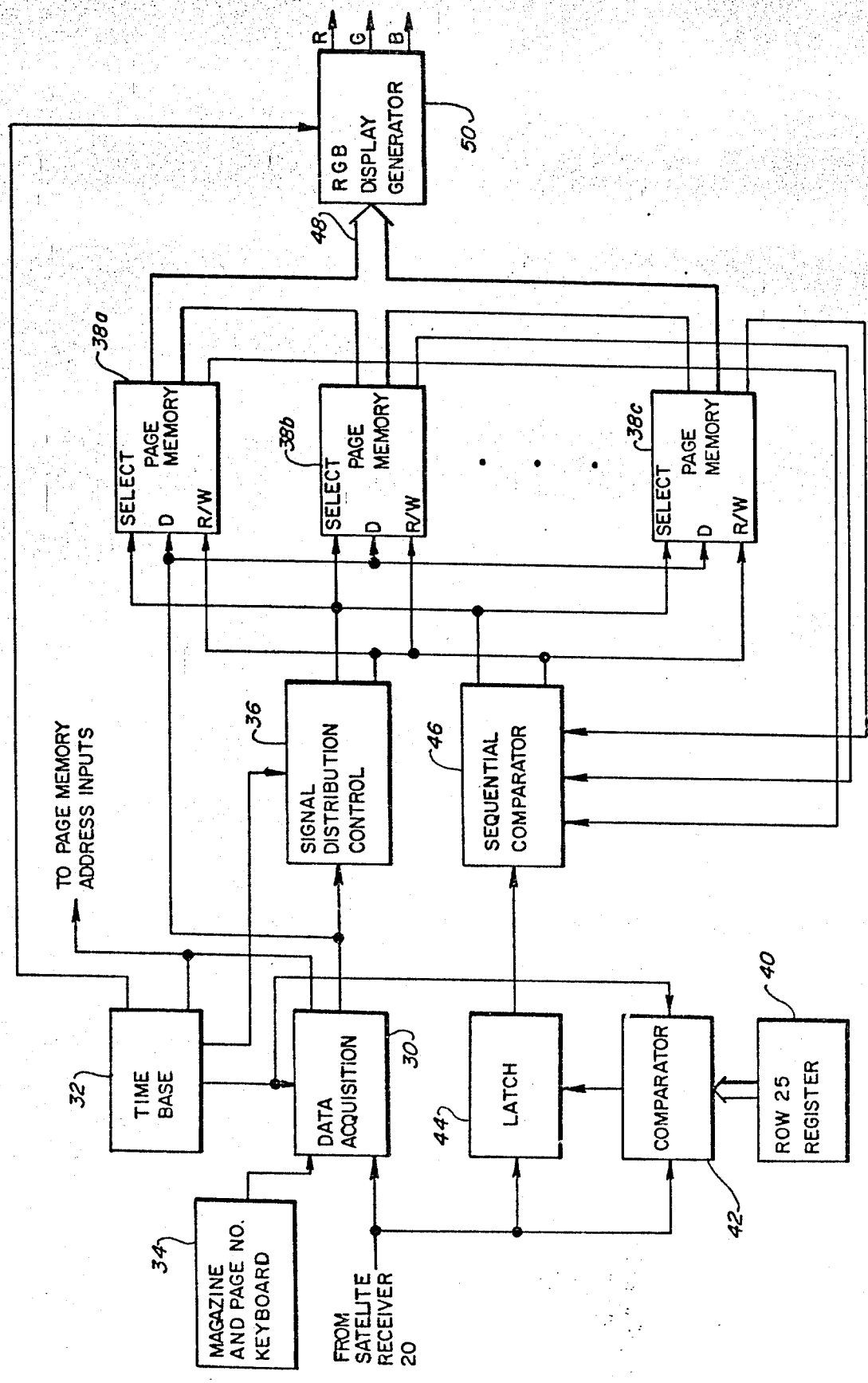
FIG. 4 is a block diagram of the multi-page teletext decoder of FIG. 1.

FIG. 4 illustrates an embodiment of decoder 22. A baseband video signal representing a received television channel is coupled from satellite receiver 20 to the data input of a conventional teletext data acquisition circuit 30. Data acquisition circuit 30 is enabled by a conventional teletext time base circuit 32 during the horizontal scanning lines of the vertical interval containing teletext encoded data, e.g. lines 17, 18, 330 and 331 in the British system. A keyboard 34 or the like is used to couple a single magazine and page number code to data acquisition circuit 30, which magazine and page number code identifies each page of the multiple page programming guide that the decoder is authorized to receive. Data acquisition circuit 30 is initially enabled for processing the pseudo page header row which conditions the data acquisition circuit for acquiring subsequently transmitted row 24. Row 24 is therefore acquired by data acquisition circuit 30 and coupled therefrom to the input of a signal distribution control circuit 36 and also to the data inputs of a plurality of identical page memories 38a–38c. Signal distribution control circuit 36 is enabled by time base circuit 32 for processing the memory page address byte contained in row 24 and for developing an output page memory select signal corresponding to the memory page address byte. The page memory select signal is coupled to the select input of each of page memories 38a–38c, the single page memory corresponding to the page memory select signal being selected for operation. In addition, signal distribution control circuit 36 develops a second output signal enabling the "write" input of the selected page memory so that, in response to address signals from time base circuit 32 and data acquisition circuit 30, the time-on and time-off codes contained in row 24 are stored at row address 24 of the selected page memory. The subsequently transmitted normal page header row together with the following 23 teletext encoded data rows are thereafter acquired by data acquisition circuit 30 and coupled from its data output to the data input of the selected page memory for storage in row addresses 0–23 thereof in a conventional manner. Each subsequently transmitted programming guide page is processed for storage in a different one of the page memories in an identical manner so that, after the transmission sequence has been completed, each teletext encoded programming guide page is stored in a respective one of the page memories 38a–38c. As discussed previously, the programming guide pages need be transmitted by satellite 10 only once a day for acquisition and storage at head end facility 12.

Decoder 22 further includes a row 25 register 40 which stores a code identical to teletext row address 25. The row 25 address code is coupled to one input of a comparator 42 which receives a second input from the output of satellite receiver 20. Comparator 42 is enabled by time base circuit 32 during each horizontal scanning line containing teletext encoded data for comparing the stored row 25 address code with the address code of each received teletext row and for enabling a latch 44 in response to an equality comparison. Latch 44 is thereby enabled for coupling the six time of day bytes contained in row 25 which, as previously mentioned, is continuously transmitted throughout the day, to one input of a sequential comparator 46. The time-on and time-off codes stored in row address 24 of each page memory 38a–38c are coupled to the other inputs of sequential comparator 46. Whenever the time interval defined by the time-on and time-off codes stored in at least one of the page memories 38a–38c corresponds to the row 25 time of day code, the sequential comparator 46 will enable the select input of the respective page memory together with its "read" input. As a consequence, the programming guide page stored in the enabled page memory is read out from the memory onto an output data bus 48 and coupled to a conventional teletext RGB display generator 50. Display generator 50, in a well known manner, decodes the stored teletext information supplied on data bus 48 in response to timing signals from time base circuit 32 and develops corresponding output R, G, B baseband video signals for application to channel modulator 24. Channel modulator 24, in turn, modulates an RF carrier with the R, G, B baseband video signals to form a standard NTSC television signal and couples the NTSC television signal to cable 14 for distribution to the subscriber receivers 16. Sequential comparator 46 is operative for cyclically scanning the page memories 38a–38c and for enabling each page memory for a short time interval if the time-on and time-off codes stored in row address 24 of the memory correspond to the current time of day code. Thus, for example, assuming that the time-on and time-off codes associated with the programming guide pages stored in five different page memories all correspond to the current time of day code, these five programming guide pages will be sequentially read from sequence being continuously repeated as long as the time-on and time-off codes correspond to the time of day code. As soon as this time correspondence no longer exists for any particular page memory, the contents thereof will cease to be read from memory. Therefore, any desired pattern of page memories may be cyclically developed on output data bus 48 which, in turn, results in the corresponding programming guide pages being cyclically displayed on the viewing screens of the subscribers receivers 16. As a result, selected groups of programming guide pages may be cyclically displayed with the groups being changed at various times during the day.

In accordance with the foregoing, it will be observed that the time of day information supplied to decoder 22 for keying page memory readout is derived from a source (i.e. row 25 of the satellite teletext transmission) not associated with cable head end facility 12. The satellite operator is therefore responsible for maintaining accurate timing and thereby freeing the head end facilities from this task. Thus, for example, in the case of a momentary power outage or other malfunction the head end facility would not be responsible for resulting an appropriate clock to operated decoder 22.

Figure 5:
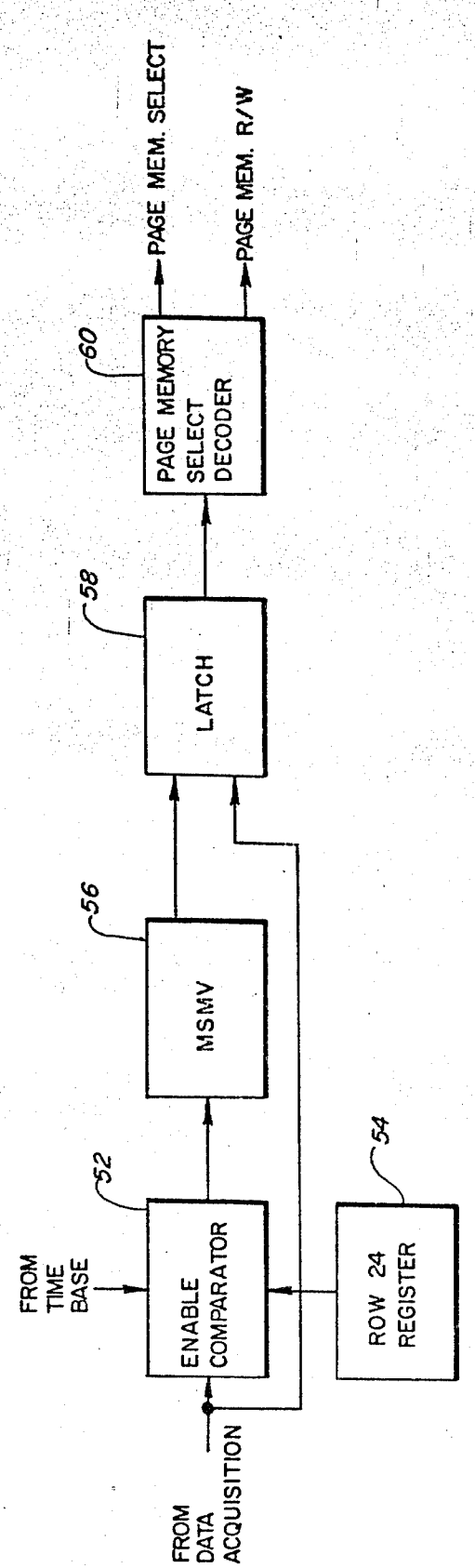
FIG. 5 is a block diagram of an embodiment of the signal distribution control circuit shown generally in FIG. 4.

FIG. 5 illustrates an embodiment of signal distribution control circuit 36 of FIG. 4. The output of data acquisition circuit 30 is coupled to one input of a comparator 52 which receives a second input from a register 54 storing a row address code corresponding to teletext encoded row address 24. Comparator 52 is enabled by time base circuit 32 during the row address bytes of each teletext encoded horizontal scanning line for comparing its row address code with the row 24 address code. An equality comparison triggers a monostable multibrator 56 whose output goes logically high for strobing a latch 58 during the memory page address byte of row 24. Latch 58 consequently passes the row 24 memory page address byte to a decoder 60 which, in turn, develops a first output identifying the selected memory page and a second output enabling the "write" input of the selected page memory. As explained previously, the time-on and time-off codes stored in row 24 together with rows 0-23 of the subsequent teletext page are then coupled to and stored in the selected page memory. The foregoing process is repeated each time a new row 24, the new row 24 including a different memory page address byte, is received until each teletext page is loaded into a respective page memory.

Figure 6:
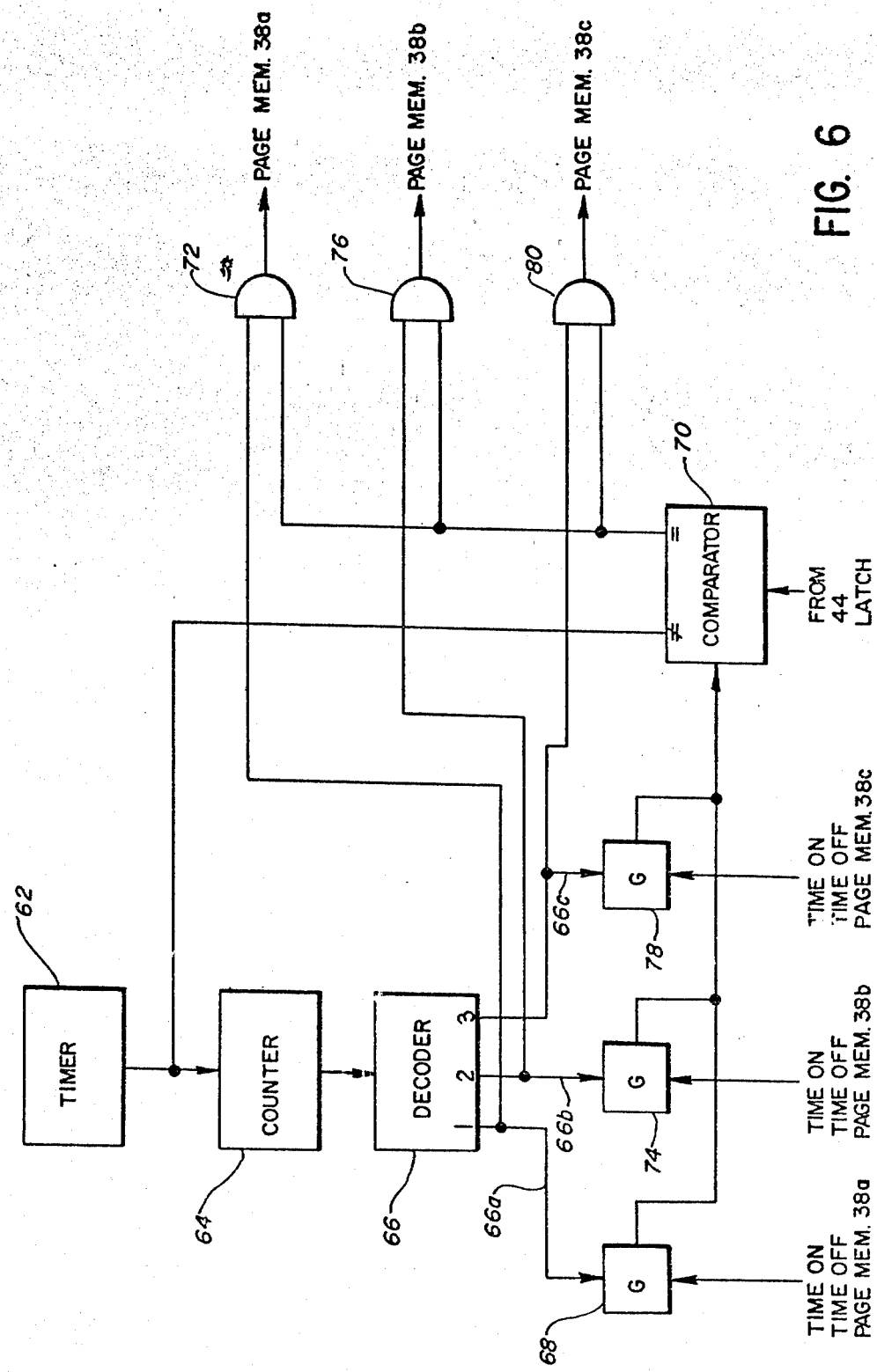
FIG. 6 is a block diagram of an embodiment of the sequential comparator shown generally in FIG. 4.

FIG. 6 illustrates an embodiment of sequential comparator 46 of FIG. 4. While the circuit shown in the drawing is intended for use with a three page memory system it may be easily expanded to accommodate any desired number of page memories. The circuit includes a timer 62 adapted for developing an output signal advancing a binary counter 64 one state approximately every 20 seconds. The output of counter 64 is coupled to the input of a one of three decoder 66 whose outputs 66a, 66b and 66c are individually driven logically high in a repetitive sequence. When output 66a is logically high, a first gate 68 is enabled for coupling the time-on and time-off codes stored in row address 24 of the first page memory 38a to a comparator 70, comparator 70 also receiving the row 25 time of day code from latch 44. At the same time, logically high output 66a of decoder 66 enables a first AND gate 72 which also receives an input from the equality output of comparator 70. Comparator 70 is adapted for determining whether the time interval defined by the time-on and time-off codes coupled thereto correspond to the current row 25 time of day code. If a correspondence therebetween is detected, the equality output of the comparator goes logically high, otherwise its non-equality output goes logically high. Therefore, while gate 68 and AND gate 72 are enabled, comparator 70 is operated for determining whether a correspondence exists between the time-on and time-off codes stored in row address 24 of memory 38a and the current row 25 time of day code. If a correspondence is found to exist, the equality output of comparator 70 goes logically high causing enabled AND gate 72 to develop a logically high output signal for reading the contents of page memory 38a onto data bus 48 for a period of 20 seconds. Thereafter, output 66a of decoder 66 goes logically low and output 66b goes logically high. As a consequence, a second gate 74 is enabled for coupling the time-on and time-off codes stored in row address 24 of page memory 38b to comparator 70. Also, a second AND gate 76 is enabled at the same time. As before, if a correspondence is detected between the time-on and time-off codes and the current time of day code, AND gate 76 develops a logically high output operating page memory 38b. Twenty seconds later, output 66b of decoder 66 goes logically low and output 66c goes logically high enabling a gate 78 for coupling the time-on and time-off codes from page memory 38c to comparator 70 and also enabling a third AND gate 80. If the time-on and time-off codes correspond to the current time of day code AND gate 80 develops a logically high output signal operating page memory 38c. The foregoing procedure is continuously repeated such that the page memories for which a condition of correspondence is detected are cyclically read onto data bus 48 for twenty second intervals.

If, at any time, comparator 70 detects a non-corresponding condition between the time-on and time-off codes of a page memory and the current time of day code, the non-equality output of the comparator goes logically high immediately advancing counter 64 to its next state thereby operating decoder 66 for interrogating the next page memory. Therefore, in effect, all of the page memories are sequentially scanned with the page memories for which a condition of time correspondence is detected being sequentially read out onto data bus 48 for respective 20 second intervals, the page memories for which a condition of time correspondence is not detected being skipped over.

FIG. 7 is a flow chart illustrating a method of programming a suitable microprocessor for achieving an alternate embodiment of sequential comparator 46. In accordance with this flow chart, one of the page memories 38a-38c is initially selected as represented by instruction block 100 and the time-on code stored in row 24 thereof is compared to the current row 25 time of day code supplied by latch 44 per decision block 102. If the time-on code is greater than or equal to the current time of day code then the time-off code stored in row 24 of the selected page memory is compared to the current time of day code per decision block 104. If the time-off code is less than or equal to the current time of day code then the selected page is rebroadcast for a time interval of about twenty seconds in accordance with instruction block 106. After the twenty second rebroadcast time interval or, if a "NO" decision is reached by either decision block 102 or 104, another one of the page memories 38a-38c is selected in accordance with instruction block 108 and a test is performed per decision block 110 to determine whether all of the stored page memories have been selected. If all of the stored page memories have not been selected, the routine is repeated starting with the decision required by block 102. On the other hand, if all of the stored pages have been selected the routine is repeated starting with the page initializing instruction block 100. It will be appreciated that the performance of the routine illustrated by the flow chart of FIG. 7 by a suitable microprocessor achieves the same results as the operation of the circuit of FIG. 6.

While particular embodiments of the invention have been shown and described, it will be obvious to those skilled in the art that changes and modifications may be made without departing from the invention in its broader aspects. Therefore, the aim of the appended claims is to cover all such changes and modifications as fall within the true spirit and scope of the invention.

What is claimed is:

1. A teletext communications system comprising:
   means transmitting multiple pages of a teletext encoded data service at selected times of the day, each of said teletext pages comprising a first non-displayable auxiliary teletext data row including a time-on code and a time-off code together defining a selected time interval and also including a unique page memory address code, said transmitting means continuously transmitting a second non-displayable auxiliary teletext data row including a current time of day code;
   a teletext decoder having a plurality of page memories, each of said memories corresponding to the page memory address code of one of said teletext pages, said teletext decoder including means for acquiring and storing each of said transmitted teletext pages at the page memory corresponding to the page memory address code associated with the first auxiliary data row of the respective teletext page; and means for automatically rebroadcasting each of said stored teletext pages for which said selected time interval coincides with the time of day code of said second auxiliary data row.

2. The teletext communications system of claim 1 wherein said rebroadcasting means comprises means for rebroadcasting said stored teletext pages in the form of a standard NTSC television signal.

3. The teletext communications system of claim 1 wherein said rebroadcasting means comprises means for sequentially rebroadcasting in a repetitive manner, each of said stored teletext pages for which said selected time interval coincides with said time of day code for a predetermined time period.

4. In a teletext communications system having means transmitting multiple pages of a teletext encoded data service at selected times of the day, each of said teletext pages comprising a first non-displayable auxiliary teletext data row including a time-on code and a time-off code together defining a selected time interval and also including a unique page memory address code, said transmitting means continuously transmitting a second non-displayable auxiliary teletext data row including a current time of day code:
- a teletext decoder having a plurality of page memories, each of said page memories corresponding to the page memory address code of one of said teletext pages, said teletext decoder including means for acquiring and storing each of said transmitted teletext pages at the page memory corresponding to the page memory address code associated with the first auxiliary data row of the respective teletext page; and
- means for automatically rebroadcasting each of said stored teletext pages for which said selected time interval coincides with the time of day code of said second auxiliary data row.

5. The improvement according to claim 4 wherein said rebroadcasting means comprises means for rebroadcasting said stored teletext pages in the form of a standard NTSC television signal.

6. The improvement according to claim 4 wherein said rebroadcasting means comprises means for sequentially rebroadcasting in a repetitive manner, each of said stored teletext pages for which said selected time interval coincides with said time of day code for a predetermined time period.

7. A teletext communications system comprising:
- means transmitting multiple pages of a teletext encoded data service at selected times of the day, each of said teletext pages comprising a first non-displayable auxiliary teletext data row including a time-on code with a time-off code together defining a selected time interval and a unique page memory address code;
- a teletext decoder having a plurality of page memories each identifiable by one of said page memory address codes, said teletext decoder including means for acquiring and storing each of said transmitted teletext pages at the page memory identified by the associated page memory address code;
- means developing a time of day code; and
- means for automatically rebroadcasting each of said stored teletext pages for which said selected time interval coincides with said time of day code.

8. The teletext communications system of claim 7 wherein said transmitting means is operative for continuously transmitting a second non-displayable auxiliary teletext row including a current time of day code, said teletext decoder including means responsive to said transmitting means for developing said time of day code.

9. The teletext communications system of claim 7 wherein said rebroadcasting means comprises means for rebroadcasting said stored teletext pages in the form of a standard NTSC television signal.

10. The teletext communications system of claim 7 wherein said rebroadcasting means comprises means for sequentially rebroadcasting in a repetitive manner, each of said stored teletext pages for which said selected time interval coincides with said time of day code for a predetermined time period.

11. In a teletext communications system having means transmitting multiple pages of a teletext encoded data service at selected times of the day, each of said teletext pages comprising a first non-displayable auxiliary teletext data row including a time-on code and a time-off code together defining a selected time interval and a unique page memory address code;
- a teletext decoder having a plurality of page memories each identifiable by one of said page memory address codes, said teletext decoder including means for acquiring and storing each of said transmitted teletext pages at the page memory identified by the associated page memory address code;
- means developing a time of day code; and
- means for automatically rebroadcasting each of said stored teletext pages for which said selected time interval coincides with said time of day code.

12. The improvement according to claim 11 wherein said transmitting means is operative for continuously transmitting a second non-displayable auxiliary teletext row including a current time of day code, said teletext decoder including means responsive to said transmitting means for developing said time of day code.

13. The improvement according to claim 11 wherein said rebroadcasting means comprises means for rebroadcasting said stored teletext pages in the form of a standard NTSC television signal.

14. The improvement according to claim 11 wherein said rebroadcasting means comprises means for sequentially rebroadcasting in a repetitive manner, each of said stored teletext pages for which said selected time interval coincides with said time of day code for a predetermined time period.

15. For receiving multiple pages of a teletext encoded data service transmitted at selected times of the day, each of said teletext pages comprising a first non-displayable auxiliary teletext data row including a time-on code and a time-off code together defining a selected time interval and also including a unique page memory address code, a second non-displayable auxiliary teletext data row including a current time of day code being transmitted in a continuous fashion, apparatus comprising:
- a teletext decoder having a plurality of page memories, each of said page memories corresponding to the page memory address code of one of said teletext pages, said teletext decoder including means for acquiring and storing each of said transmitted teletext pages at the page memory corresponding to the page memory address code associated with the first auxiliary data row of the respective teletext page; and
- means for automatically rebroadcasting each of said stored teletext pages for which said selected time interval coincides with the time of day code of said second auxiliary data row.

16. Apparatus according to claim 15 wherein said rebroadcasting means comprises means for rebroadcasting said stored teletext pages in the form of a standard NTSC television signal.

17. Apparatus according to claim 15 wherein said rebroadcasting means comprises means for sequentially rebroadcasting in a repetitive manner, each of said stored teletext pages for which said selected time interval coincides with said time of day code for a predetermined time period.

18. For receiving multiple pages of a teletext encoded data service transmitted at selected times of the day, each of said teletext pages comprising a first non-displayable auxiliary teletext data row including a time-on code and a time-off code together defining a selected time interval and a unique page memory address code, apparatus comprising:
  a teletext decoder having a plurality of page memories each identifiable by one of said page memory address codes, said teletext decoder including means for acquiring and storing each of said transmitted teletext pages at the page memory identified by the associated page memory address code;
  means developing a time of day code; and
  means for automatically rebroadcasting each of said stored teletext pages for which said selected time interval coincides with said time of day code.

19. Apparatus according to claim 18 wherein said means developing a time of day code is responsive to a continuously transmitted second non-displayable auxiliary teletext row including a time of day code.

20. For receiving multiple pages of a teletext encoded data service transmitted at selected times of the day, each of said teletext pages comprising a first non-displayable auxiliary teletext data row including a time-on code and a time-off code together defining a selected time interval and also including a unique page memory address code, a second non-displayable auxiliary teletext data row including a current time of day code being transmitted in a continuous fashion, apparatus comprising:
  a teletext decoder having a plurality of page memories, each of said page memories corresponding to the page memory address code of one of said teletext pages, said teletext decoder including means for acquiring and storing each of said transmitted teletext pages at the page memory corresponding to the page memory address code associated with the first auxiliary data row of the respective teletext page; and
  means responsive to said second auxiliary data row for automatically rebroadcasting, in a repetitive sequential manner, said stored teletext pages for which said selected time interval coincides with said time of day code.

* * * * *